United States Patent
Flacht et al.

(10) Patent No.: US 10,746,252 B2
(45) Date of Patent: Aug. 18, 2020

(54) SHOCK ABSORBER WITH HYDRAULIC COMPRESSION STOP VALVE

(71) Applicant: BeijingWest Industries Co., Ltd., Beijing (CN)

(72) Inventors: Piotr Andrzej Flacht, Cracow (PL); Dominik Kasprzyk, Debica (PL)

(73) Assignee: BEIJINGWEST INDUSTRIES CO., LTD., Beijing (CN)

( * ) Notice: Subject to any disclaimer, the term of this patent is extended or adjusted under 35 U.S.C. 154(b) by 29 days.

(21) Appl. No.: 16/120,184

(22) Filed: Aug. 31, 2018

(65) Prior Publication Data

US 2019/0162266 A1    May 30, 2019

Related U.S. Application Data

(60) Provisional application No. 62/591,019, filed on Nov. 27, 2017.

(51) Int. Cl.
*F16F 9/49* (2006.01)
*F16F 9/34* (2006.01)
(Continued)

(52) U.S. Cl.
CPC .............. *F16F 9/49* (2013.01); *F16F 9/18* (2013.01); *F16F 9/34* (2013.01); *F16F 9/3405* (2013.01);
(Continued)

(58) Field of Classification Search
CPC .. F16F 9/34; F16F 9/3405; F16F 9/342; F16F 9/348; F16F 9/3481; F16F 9/3482; F16F 9/3488; F16F 9/49
(Continued)

(56) References Cited

U.S. PATENT DOCUMENTS 2,352,197 A * 6/1944 Harvey .................. F41A 25/02
188/282.8
2,616,687 A * 11/1952 Butterfield .............. F16F 9/063
267/64.17
(Continued)

FOREIGN PATENT DOCUMENTS

CN    102076988 A    5/2011
CN    202176657 U    3/2012
(Continued)

OTHER PUBLICATIONS

Extended European Search Report dated Apr. 25, 2019 for counterpart European patent application No. EP18208201.6.
(Continued)

*Primary Examiner* — Thomas J Williams
(74) *Attorney, Agent, or Firm* — William H. Honaker; Dickinson Wright PLLC

(57) ABSTRACT

A shock absorber having a main tube extends between a first end and a second end defining a fluid chamber therebetween. A main piston is slidably disposed in the fluid chamber dividing the fluid chamber into a compression chamber and a rebound chamber. A piston rod is attached to the main piston. A hydraulic compression stop including an additional piston is attached to the piston rod for movement therewith. The additional piston includes a body extending from the piston rod and defining a conduit extending along the center axis. An actuator is disposed in the conduit and attached to the body movable from a closed position to an open position during the compression stroke with the open position allowing fluid flow through the actuator and the conduit and the closed position preventing fluid flow through the actuator. The actuator includes a spring and a blocking member disposed in the conduit.

8 Claims, 5 Drawing Sheets

(51) Int. Cl.
*F16F 9/18* (2006.01)
*F16F 9/348* (2006.01)

(52) U.S. Cl.
CPC .............. *F16F 9/348* (2013.01); *F16F 9/185* (2013.01); *F16F 2228/066* (2013.01); *F16F 2230/0023* (2013.01)

(58) Field of Classification Search
USPC ........................................................ 188/288
See application file for complete search history.

(56) References Cited

U.S. PATENT DOCUMENTS

| | | | |
|---|---|---|---|
| 2,907,414 A * | 10/1959 | Patriquin | F16F 9/49 188/288 |
| 3,086,622 A | 4/1963 | Schultze | |
| 4,045,008 A * | 8/1977 | Bauer | F16F 9/36 267/120 |
| 4,203,507 A * | 5/1980 | Tomita | F16F 9/348 188/282.9 |
| 4,345,748 A | 8/1982 | Wossner et al. | |
| 5,509,512 A | 4/1996 | Grundei | |
| 5,615,756 A | 4/1997 | Grundei et al. | |
| 6,439,263 B2 * | 8/2002 | Schwegler | F02M 69/54 137/514.5 |
| 2,783,859 A1 | 7/2013 | Patriquin | |
| 8,701,846 B2 | 4/2014 | Reybrouck et al. | |
| 2011/0278775 A1 | 11/2011 | Ing | |
| 2016/0153517 A1 | 6/2016 | Senar | |

FOREIGN PATENT DOCUMENTS

| | | |
|---|---|---|
| CN | 103953676 A | 7/2014 |
| JP | 6377972 B2 | 8/2018 |
| WO | 2016146660 A1 | 9/2016 |
| WO | 2017001675 A1 | 1/2017 |

OTHER PUBLICATIONS

First Office Action and Search Report dated Mar. 4, 2020 for counterpart Chinese patent application No. 201811397797.8, along with machine EN translation downloaded from EPO.

* cited by examiner

SHOCK ABSORBER WITH HYDRAULIC COMPRESSION STOP VALVE

CROSS-REFERENCE TO RELATED APPLICATIONS

This application claims the benefit of U.S. Provisional Patent Application No. 62/591,019 filed on Nov. 27, 2017 and titled "SHOCK ABSORBER WITH HYDRAULIC COMPRESSION STOP VALVE", the entire disclosure of which is hereby incorporated by reference.

BACKGROUND OF THE INVENTION

1. Field of the Invention

The present disclosure generally relates to a shock absorber assembly with a hydraulic compression stop valve.

2. Description of the Prior Art

Traditionally, a shock absorber assembly for a vehicle is provided with a first end stop member, which is arranged inside the shock absorber assembly and is configured to operate during the rebound stroke of the shock absorber assembly, and a second end stop member, which is arranged outside the shock-absorber and is configured to operate during the compression stroke of the shock absorber assembly. The end stop members may be of elastic or hydraulic type. The elastic end stop members are made of high-stiffness elastic material and have the function of absorbing impact energy when the shock absorber assembly reaches the end-of-travel position, either during the rebound stroke or during the compression stroke. The elastic end stop members behave as springs at the end-of-travel positions and have a much higher stiffness than that of the mechanical spring of the suspension.

One such a shock absorber assembly is disclosed in PCT Application Publication Number WO2016146660. The shock absorber includes a main tube disposed on a center axis and extending between a first end and a second end defining a fluid chamber extending therebetween for containing a working fluid. A main piston is slidably disposed in the fluid chamber and divides the fluid chamber into a compression chamber and a rebound chamber. The compression chamber extends between the main piston and the first end. The rebound chamber extends between the main piston and the second end. A piston rod is disposed on the center axis and attached to the main piston for moving the main piston between a compression stroke and a rebound stroke. A hydraulic compression stop including an additional piston is disposed in the compression chamber, adjacent to the main piston, and attached to the piston rod for movement with the piston rod during the compression stroke and the rebound stroke to provide additional damping force. The additional piston includes a body disposed on the center axis extending from the piston rod to a body end spaced from the first end and defining a conduit extending along the center axis and in fluid communication with the fluid chamber.

The hydraulic compression stop tends to increase a level of forces generated by the shock absorber at the end of the compression stroke. More particularly, at very high velocities, compression stroke movement forces, e.g., caused by the vehicle hitting obstacles, can increase rapidly at the end of the compression stroke. The rapid increase in the compression stroke movement forces could potentially damage the internal components of the shock absorber assembly and vehicle module components.

SUMMARY OF THE INVENTION

The present disclosure provides a shock absorber assembly that limits maximum forces that can be achieved by the hydraulic compression stop, thereby avoiding damaging internal components of the shock absorber assembly and vehicle module components.

The present disclosure provides for a shock absorber assembly including an actuator disposed in the conduit and attached to the body and movable from a closed position to an open position during the compression stroke, with the open position allowing the working fluid to flow through the actuator and the conduit, and the closed position preventing the working fluid from flowing through the actuator and the conduit.

BRIEF DESCRIPTION OF THE DRAWINGS

Other advantages of the present invention will be readily appreciated, as the same becomes better understood by reference to the following detailed description when considered in connection with the accompanying drawings wherein.

DESCRIPTION OF THE ENABLING EMBODIMENT

Figure 1:
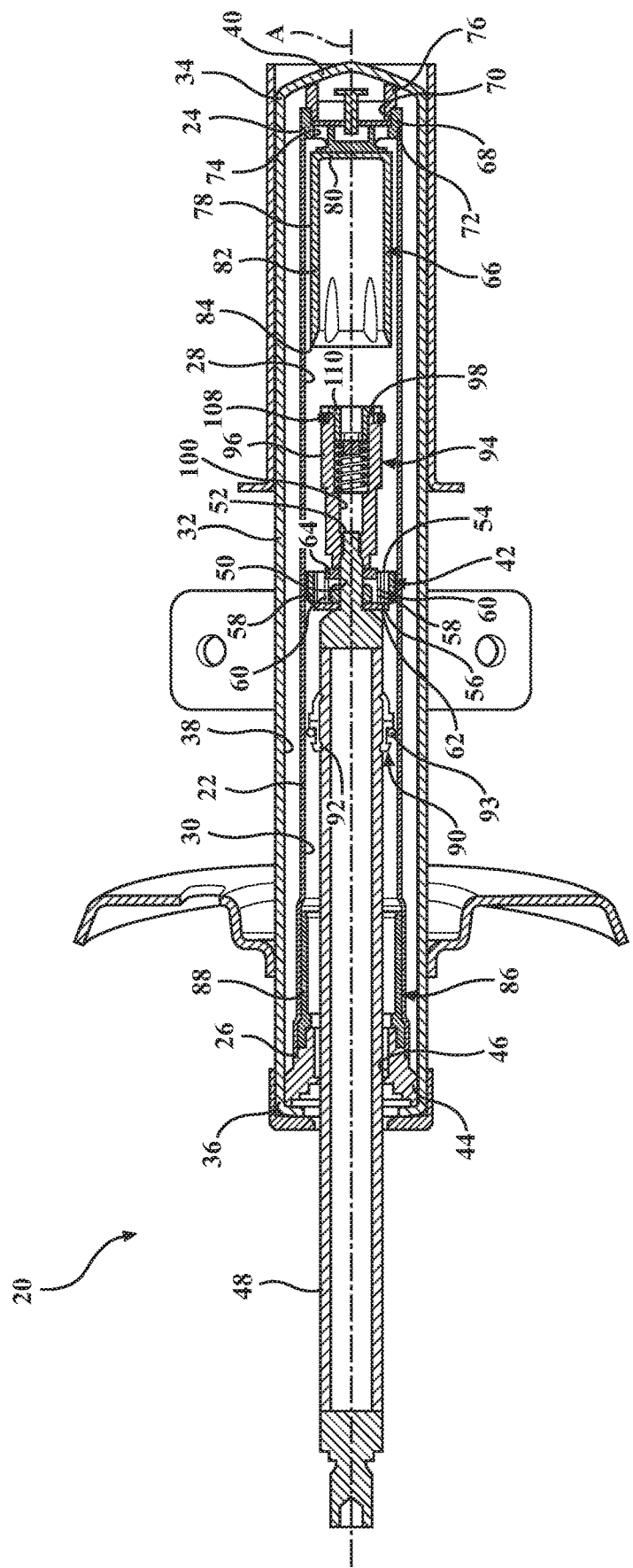
FIG. 1 is a cross-sectional perspective view of the shock absorber assembly in accordance with the present disclosure.

Referring to the Figures, wherein like numerals indicate corresponding parts throughout the several views, the shock absorber assembly 20 in accordance with the present disclosure is generally shown in FIG. 1.

The shock absorber assembly 20, as best shown in FIG. 1, includes a main tube 22 disposed on a center axis A, having a generally cylindrical shape, and extends annularly about the center axis A between a first end 24 and a second end 26. The main tube 22 defines a fluid chamber 28, 30 extending between the first end 24 and the second end 26 for containing a working fluid. An external tube 32 disposed on the center axis A radially spaced from the main tube 22, having a generally cylindrical shape, and extending annularly about the center axis A between a closed end 34 and an open end 36. The closed end 34 is disposed adjacent to the first end 24 of the main tube 22. The open end 36 is disposed adjacent to the second end 26 of the main tube 22 defining a compensation chamber 38 disposed about the center axis A between the main tube 22 and the external tube 32. A cap 40 disposed at the closed end 34 of the external tube 32 to close the fluid chamber 28, 30 and the compensation chamber 38.

It should be appreciated that the main tube 22 and the external tube 32 may have a shape other than cylindrical. In addition, it should be appreciated that the external tube 32 may further include a mounting ring, having a generally circular shape, may be disposed on the cap 40 for attaching the shock absorber to the vehicle.

A main piston 42, having a generally cylindrical shape, is slidably disposed in the fluid chamber 28, 30 and movable along the center axis A. The main piston 42 divides the fluid chamber 28, 30 into a compression chamber 28 and a rebound chamber 30. The compression chamber 28 extends between the main piston 42 and the first end 24 of the main tube 22. The rebound chamber 30 extends between the main piston 42 and the second end 26 of the main tube 22. A piston rod guide 44 is disposed in the rebound chamber 30, adjacent to the second end 26 of the main tube 22 and the open end 36 of the external tube 32, and in sealing engagement with the main tube 22 and the external tube 32 to close the rebound chamber 30 and the compensation chamber 38. The piston rod guide 44 defines a bore 46, having a generally cylindrical shape, extending along the center axis A and in communication with the rebound chamber 30.

A piston rod 48, having a generally cylindrical shape, is disposed on the center axis A and extends along the center axis A, through the bore 46 of the piston rod guide 44, into the rebound chamber 30 and attached to the main piston 42 for moving the main piston 42 between a compression stroke and a rebound stroke. The compression stroke is defined as the main piston 42 moving toward the first end 24 of the main tube 22 and the closed end 34 of the external tube 32. The rebound stroke is defined as the main piston 42 moving toward the second end 26 of the main tube 22 and the piston rod guide 44. The piston rod 48 includes a projection 50, having a generally cylindrical shape, disposed on the center axis A and extending outwardly from the piston rod 48 through the main piston 42 to a distal end 52 axially spaced from the main piston 42. It should be appreciated that the projection 50 may include a thread extending helically about the projection 50.

The main piston 42 has a compression surface 54 and a rebound surface 56. The compression surface 54 of the main piston 42 is disposed in the compression chamber 28. The rebound surface 56 of the main piston 42 is disposed in the rebound chamber 30. The main piston 42 defines a plurality of passages 58, 60 including compression passages 58 and rebound passages 60 for allowing the working fluid to flow through the main piston 42 during the compression stroke and the rebound stroke. The compression passages 58 extend between the compression surface 54 and the rebound surface 56. The rebound passages 60 extend between the compression surface 54 and the rebound surface 56 and radially spaced from the compression passages 58. The main piston 42 includes a compression valve 62 having at least one plate, having a generally circular shape, disposed adjacent to the rebound surface 56 of the main piston 42 to cover the compression passages 58 for limiting the flow of the working fluid through the main piston 42 during the compression stroke. The main piston 42 further includes a rebound valve 64 having at least one plate, having a generally circular shape, and disposed adjacent to the compression surface 54 of the main piston 42 and covering the rebound passages 60 for limiting the flow of the working fluid through the main piston 42 during the rebound stroke.

A hydraulic compression stop 66 is disposed in the compression chamber 28 and attached to the first end 24 of the main tube 22 for providing additional damping force during the compression stroke. The hydraulic compression stop 66 includes a fixed member 68, having a generally cylindrical shape, and attached to the first end 24 of the main tube 22. It should be appreciated that the fixed member 68 may be made from sintered steel or any other suitable solid material, e.g. stainless steel or plastic. The fixed member 68 has an internal cylindrical surface and an external cylindrical surface. The internal cylindrical surface extends annularly about the center axis A and defines a cavity 70. The external cylindrical surface, spaced from the internal cylindrical surface, extends annularly about the center axis A and defines a shoulder 72 for receiving the first end 24 of the main tube 22. The fixed member 68 defines at least one axial channel 74 extending through the fixed member 68 and parallel to the center axis A and in fluid communication with the compression chamber 28. It should be appreciated that the at least one axial channel 74 may include a plurality of (e.g., eight) axial channels 74 disposed radially about the center axis A, spaced equidistantly from one another, to allow the working fluid to flow from the fluid chamber 28, 30 to the compression chamber 28.

A base valve 76 disposed in the cavity 70, attached to the fixed member 68, and adjacent to the closed end 34 of the external tube 32 for regulating fluid flow between the compression chamber 28 and the compensation chamber 38. The hydraulic compression stop 66 includes an insert 78, having a generally cylindrical shape, disposed on the center axis A in the compression chamber 28. It should be appreciated that the insert 78 may be made from a material such as, but not limited to, integrally formed polyamide. The insert 78 includes a bottom 80, having a circular shape, and a wall 82, having a tubular shape. The bottom 80 of the insert 78 is disposed in compression chamber 28 and attached to the fixed member 68. The wall 82 of the insert 78 is also disposed in the compression chamber 28, spaced radially from the main tube 22, and extending annularly outwardly from the bottom 80, and tapering toward a primary end 84.

The shock absorber also includes a hydraulic rebound stop 86. The hydraulic rebound stop 86 has a sleeve 88, having a generally tubular shape, disposed on the center axis A and in the rebound chamber 30, and attached to the piston rod guide 44. The sleeve 88 extends annularly outwardly from the piston rod guide 44 abutting the main tube 22 toward the first end 24 of the main tube 22. It should be appreciated that, instead of abutting the main tube 22, the sleeve 88 may be spaced from the main tube 22 and extending toward the first end 24 of the main tube 22.

A force reducing device 90 is disposed in the rebound chamber 30, between the piston rod guide 44, and the main piston 42 and attached to the piston rod 48. The force reducing device 90 divides the rebound chamber 30 into a first compartment and a second compartment. The first compartment extends between the piston rod guide 44 and the force reducing device 90. The second compartment extends between the main piston 42 and the force reducing device 90 for providing additional damping force in response to the axial movement of the main piston 42 during the rebound stroke. The force reducing device 90 includes a ring guide 92 attached to the piston rod 48. The ring guide 92 extends between a lower surface disposed adjacent to the main piston 42 and an upper surface axially spaced from the lower surface.

A ring 93 is slidably disposed about the ring guide 92 between the upper surface and the lower surface, in sealing engagement with the sleeve 88, and movable along the center axis A between an unblocked position and a blocked position. The unblocked position is defined as the ring 93 being disposed adjacent to the upper surface to allow fluid flow through the ring guide 92 between the first compartment and the second compartment. The blocked position is defined as the ring 93 being abutting the lower surface of the ring guide 92 to prevent fluid flow through the ring guide 92 and close the fluid communication between the first compartment and the second compartment.

The hydraulic compression stop 66 includes an additional piston 94 disposed in the compression chamber 28 and attached the piston rod 48 for movement with the piston rod 48 during the compression stroke and the rebound stroke and engaging the wall 82 during the compression stroke. It should be appreciated that the additional piston 94 may be attached to the distal end 52 of the projection 50 of the piston rod 48. The additional piston 94 includes a body 96, having a generally cylindrical shape, disposed on the center axis A and attached to the distal end 52 of the projection 50.

As best shown in FIG. 1, the body 96 extends outwardly from the piston rod 48, along the center axis A, to a body end 98 spaced from the distal end 52 of the piston rod 48. It should be appreciated that the body 96 may be attached to the piston rod 48 via a thread engagement with the distal end 52 of the piston rod 48. Alternatively, the body 96 may be attached to the piston rod 48 via other methods such as, but not limited to, welding.

The body 96 defines a conduit 100 extending along the center axis A to the body end 98 and in fluid communication with the fluid chamber 28, 30. The conduit 100 has a generally cylindrical shape and defines a conduit diameter $D_1$ for receiving an actuator 102. The body 96 further defines at least one orifice 104, 106 disposed in fluid communication with the conduit 100 of the body 96 for allowing the working fluid to exit the body 96. A seal 108, having a generally circular shape and made from an elastomeric material, is disposed in the compression chamber 28 and extends annularly about the body 96 for engaging the wall 82 of the compression stop during the compression stroke of the main piston 42.

The actuator 102 is disposed in the conduit 100 and movable between from a closed position to an open position. In the open position, the actuator 102 allows the working fluid to flow through the actuator 102 and the conduit 100. In the closed position, the actuator 102 prevents the working fluid from flowing through the actuator 102 and the conduit 100. In other words, the actuator 102 is initially in the closed position and, in response to the piston rod 48, the additional piston 94, and the main piston 42 moving during the compression stroke, the actuator 102 moves from the closed position to the open position. A retainer 110, having a generally cylindrical shape, is disposed in the conduit 100 and attached to the body 96 for securing the actuator 102 in the conduit 100 and sandwich the seal 108 between the retainer 110 and the body 96. The retainer 110 defines a hole 112, having a generally cylindrical shape, having a hole diameter $D_H$ with the hole diameter $D_H$ being less than the conduit diameter $D_1$ and disposed on the center axis A. The hole 112 extends through the retainer 110 and is disposed in fluid communication with the conduit 100 for allowing the working fluid to flow through the retainer 110 and the conduit 100. The at least one orifice 104, 106 includes a pair of orifices 104, 106 having a first orifice 104 and a second orifice 106 disposed opposite of one another relative to the center axis A. The first orifice 104 defines a first orifice diameter $D_{FO}$ and the second orifice 106 defining a second orifice diameter $D_{SO}$ with the first orifice diameter $D_{FO}$ being greater than the second orifice diameter $D_{SO}$.

Figure 6:
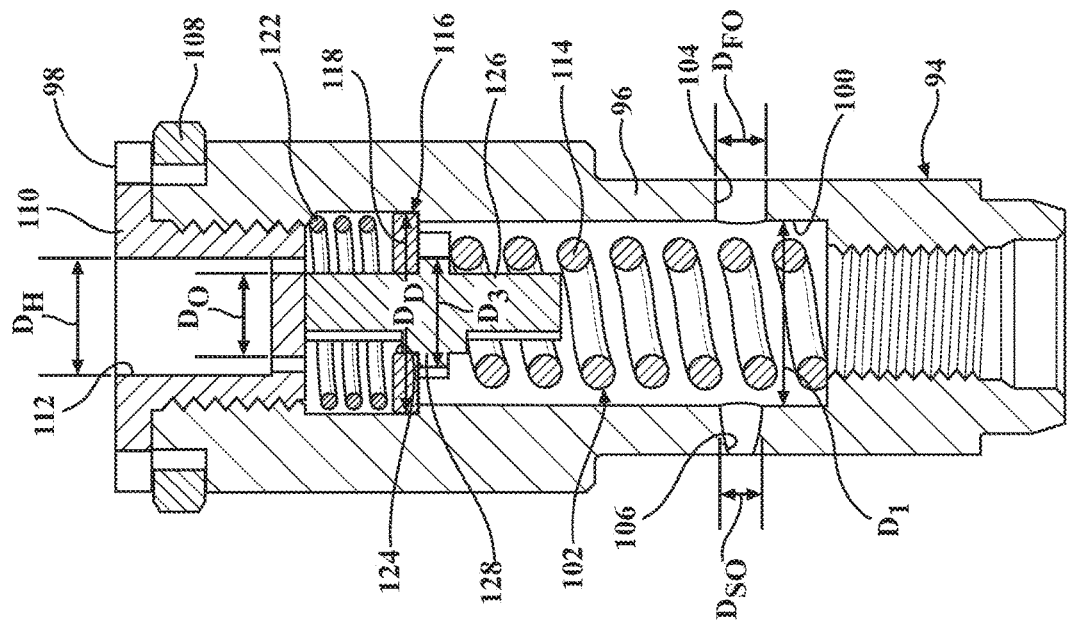
FIG. 6 is a cross-sectional perspective view of the additional piston of the shock absorber shown in FIGS. 2 and 4.

The actuator 102 includes a first spring 114 having a predetermined spring tension disposed in the conduit 100 and a blocking member 116 disposed in the conduit 100 and sandwiched between the first spring 114 and the retainer 110 for limiting the flow of the working fluid through the conduit 100. As best shown in FIG. 6, the blocking member 116 is a disc 118, having a generally circular shape, disposed between the spring and the retainer 110. The disc 118 defines a disc diameter $D_D$ being greater than the hole diameter $D_H$ for biasing against the retainer 110 to prevent the working fluid from flowing through the conduit 100 in the closed position. The disc diameter $D_D$ is greater than the conduit diameter $D_1$ to allow the working fluid to flow around the disc 118 and through the conduit 100 in response to the fluid pressure being greater than the predetermined spring tension in the open position.

Figure 3:
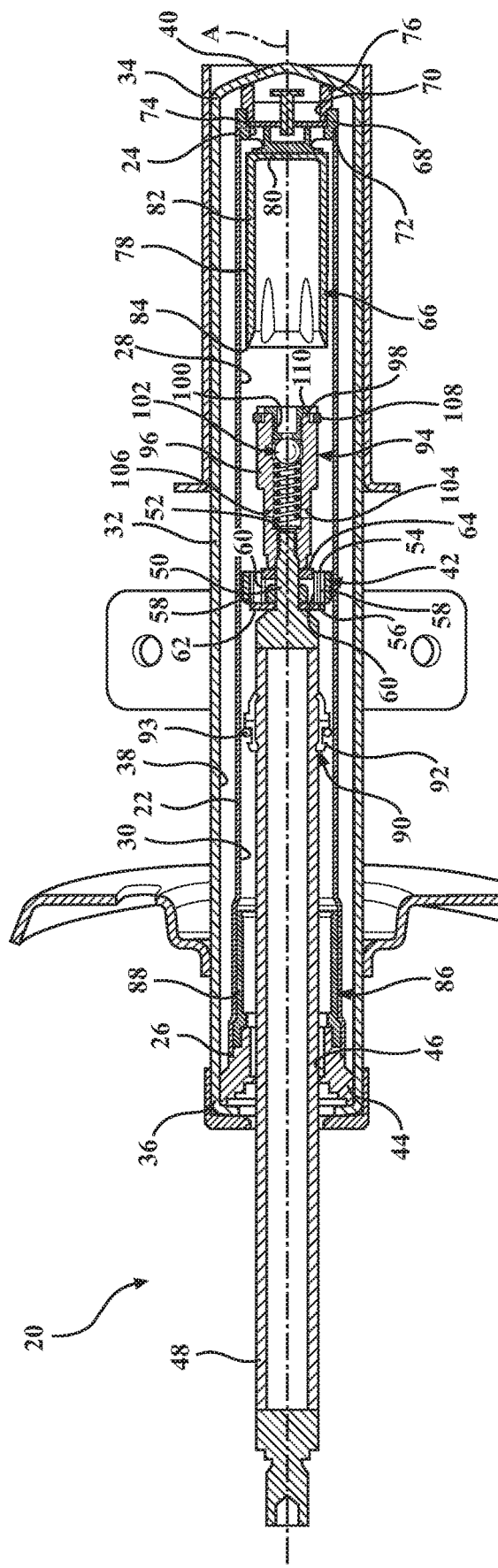
FIG. 3 is a cross-sectional perspective view of an alternative embodiment in accordance with the present disclosure.
Figure 5:
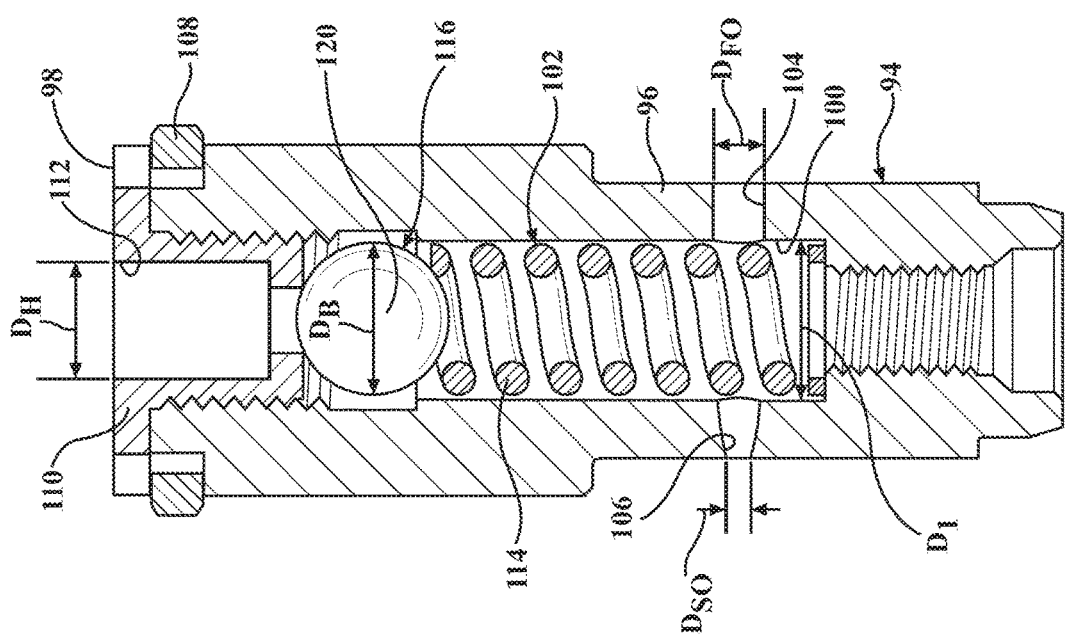
FIG. 5 is a cross-sectional perspective view of the additional piston of the shock absorber shown in FIG. 3.

An alternative embodiment of the shock absorber assembly 20 in accordance with the present disclosure is shown in FIGS. 3 and 5. As illustrated in FIGS. 3 and 5, the blocking member 116 is a ball 120, having a spherical shape, disposed between the spring and the retainer 110. The ball 120 defines a ball diameter $D_B$ being greater than the hole diameter $D_H$ for biasing against the retainer 110 to prevent the working fluid from flowing through the conduit 100 in the closed position. The ball diameter $D_B$ is also less than the conduit diameter $D_1$ to allow the working fluid to flow around the ball 120 and through the conduit 100 in response to the fluid pressure being greater than the predetermined spring tension.

Figure 2:
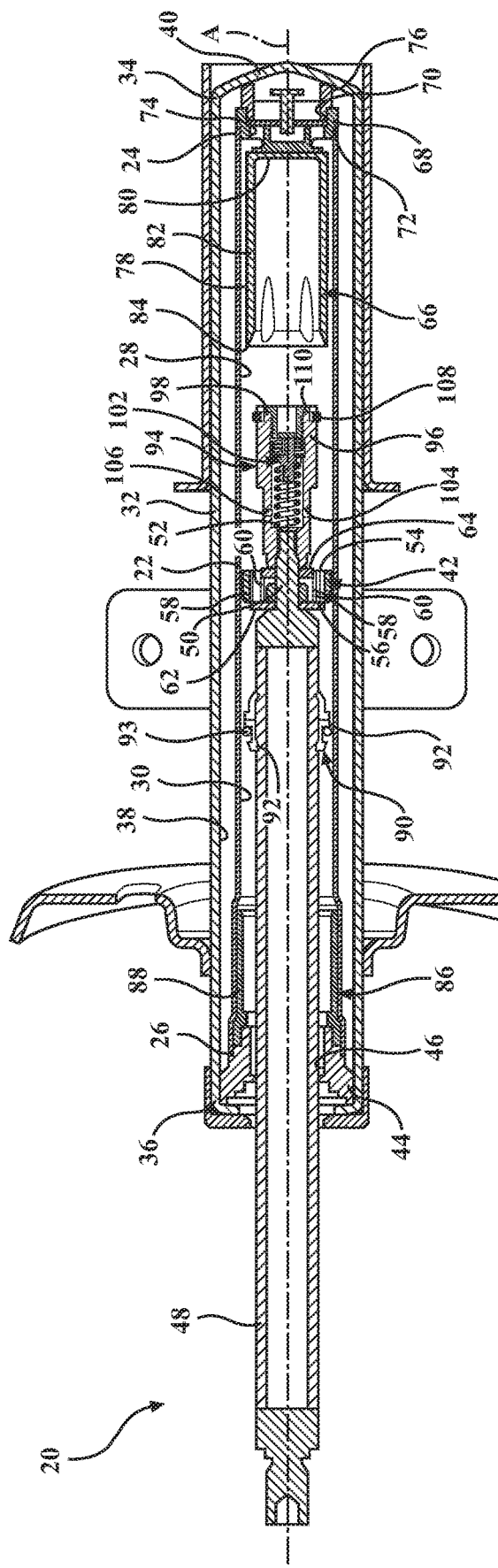
FIG. 2 is a cross-sectional perspective view of an alternative embodiment in accordance with the present disclosure.
Figure 4:
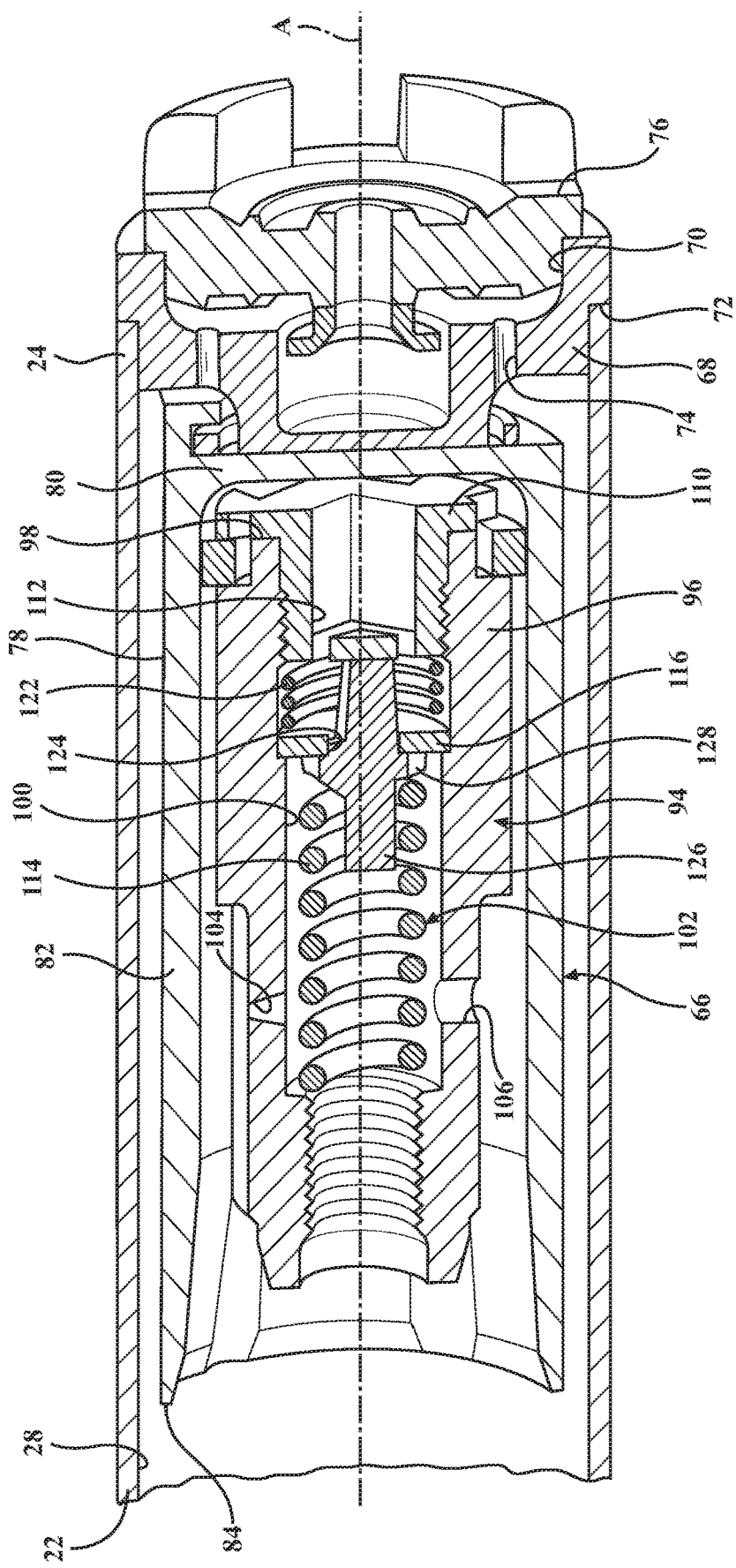
FIG. 4 is an enlarged cross-sectional perspective view of the shock absorber assembly shown in FIG. 2.

An alternative embodiment of the shock absorber assembly 20 in accordance with the present disclosure is shown in FIGS. 2, 4, and 6. As illustrated in FIGS. 2, 4, and 6, a second spring 122 is disposed in the conduit 100 and extends between the retainer 110 and the disc 118 to sandwich the disc 118 between the first spring 114 and the second spring 122. The disc 118 defines an opening 124, having a generally circular shape, disposed on the center axis A and having an opening diameter Do for allowing fluid communication through the disc 118. A shaft 126, having a generally cylindrical shape, is disposed in the conduit 100 between the disc 118 and the first spring 114. The shaft 126 extends along the center axis A, through the opening 124, for limiting fluid flow through the opening 124. The shaft 126 includes a collar 128 disposed in the conduit 100, extending radially outwardly from the shaft 126 and annularly about the center axis A. The collar 128 defines a collar diameter $D_3$ with the collar diameter $D_c$ being greater than the opening diameter Do to prevent the shaft 126 from sliding through the opening 124 and to block fluid flow through the opening 124. Although the figures show that the additional piston 94 including the actuator 102 is used in connection with a twin-tube type shock absorber assembly, it should be appreciated that the present disclosure can also be used in connection with a mono-tube type shock absorber assembly.

In operation, during the compression stroke, the main piston 42 and the additional piston 94 toward the closed end 34 of the external tube 32 and the first end 24 of the main tube 22. In response to the movement of the piston rod 48, the main piston 42, and the additional piston 94, the working fluid flows from the compression chamber 28 to the rebound chamber 30 or the compensation chamber 38. In addition, during the compression stroke, the seal 108 of the additional piston 94 slidably engages the wall 82 of the insert 78 thereby providing additional damping force. Throughout the compression stroke, in response to a fluid pressure being less than the predetermined spring tension, the actuator 102 remains in the closed position preventing the working fluid from flowing through the conduit 100 of the body 96. In response to the fluid pressure being greater than the predetermined spring tension, the actuator 102 moves from the closed position to the open position allowing working fluid to flow through the conduit 100 of the body 96 to reduce fluid pressure in the hydraulic compression stop 66 thereby limiting the maximum forces that can be exerted on the hydraulic compression stop 66.

Obviously, many modifications and variations of the present invention are possible in light of the above teachings and may be practiced otherwise than as specifically described while within the scope of the appended claims. These antecedent recitations should be interpreted to cover any combination in which the inventive novelty exercises its utility. The use of the word "said" in the apparatus claims refers to an antecedent that is a positive recitation meant to be included in the coverage of the claims whereas the word "the" precedes a word not meant to be included in the coverage of the claims.

What is claimed is:

1. A shock absorber assembly comprising:
    a main tube disposed on a center axis and extending between a first end and a second end defining a fluid chamber extending therebetween for containing a working fluid;
    a main piston slidably disposed in said fluid chamber dividing said fluid chamber into a compression chamber between said main piston and said first end and a rebound chamber being between said main piston and said second end;
    a piston rod disposed on said center axis and attached to said main piston for moving said main piston in a compression stroke and a rebound stroke;
        a hydraulic compression stop including an additional piston disposed in said compression chamber adjacent to said main piston and attached to said piston rod for movement with said piston rod during said compression stroke and said rebound stroke to provide additional damping force;
        said additional piston including a body disposed on said center axis extending from said piston rod to a body end spaced from said first end and defining a conduit extending along said center axis and in fluid communication with said fluid chamber; and
        an actuator disposed in said conduit and attached to said body and being movable from a closed position to an open position during said compression stroke with said open position allowing the working fluid to flow through said actuator and said conduit and said closed position preventing the working fluid from flowing through said actuator and said conduit;
        wherein said conduit has a cylindrical shape defining a conduit diameter for receiving said actuator;
        wherein a retainer is disposed in said conduit and is attached to said body for securing said actuator in said conduit;
    wherein said retainer defines a hole having a hole diameter being less than said conduit diameter and disposed on said center axis and in fluid communication with said conduit for allowing the working fluid to flow through said retainer and said conduit;
    wherein said actuator includes a first spring having a predetermined spring tension disposed in said conduit and a blocking member disposed in said conduit and sandwiched between said first spring and said retainer for limiting the flow of the working fluid through said conduit;
        wherein said blocking member is a disc of circular shape disposed between said first spring and said retainer;
        wherein a second spring having a predetermined spring tension is disposed in said conduit and extends between said retainer and said disc to sandwich said disc between said first spring and said second spring and spaces said disc from said retainer.

2. The shock absorber as set forth in claim 1 wherein said body defines at least one orifice disposed in fluid communication with said conduit for allowing the working fluid to exit said body.

3. The shock absorber assembly as set forth in claim 2 wherein said at least one orifice includes a pair of orifices having a first orifice defining a first orifice diameter and a second orifice defining a second orifice diameter disposed opposite of one another relative to said center axis.

4. The shock absorber assembly as set forth in claim 3 wherein said first orifice diameter is greater than said second orifice diameter.

5. The shock absorber assembly as set forth in claim 1 wherein said disc defines a disc diameter being greater than said hole diameter for biasing against said retainer to prevent the working fluid from flowing through said conduit and greater than said conduit diameter to allow the working fluid to flow around said disc and through said conduit in response to a fluid pressure being greater than said predetermined spring tension of said second spring.

6. The shock absorber assembly as set forth in claim 1 wherein said disc defines an opening defining an opening diameter disposed on said center axis for allowing fluid communication through said disc.

7. The shock absorber assembly as set forth in claim 6 further including a shaft disposed in said conduit between said disc and said first spring and extending along said center axis through said opening for limiting fluid flow through said opening of said disc.

8. The shock absorber assembly as set forth in claim 7 wherein said shaft includes a collar disposed in said conduit and extending radially outwardly from said shaft and annularly about said center axis defining a collar diameter with said collar diameter being greater than said opening diameter to prevent said shaft from sliding through said opening and block fluid flow through said opening.

* * * * *